(12) United States Patent
Nakayama et al.

(10) Patent No.: US 11,230,019 B2
(45) Date of Patent: Jan. 25, 2022

(54) POSTURE ANGLE CALCULATION APPARATUS, MOVING APPARATUS, POSTURE ANGLE CALCULATION METHOD, AND PROGRAM

(71) Applicant: TOYOTA JIDOSHA KABUSHIKI KAISHA, Toyota (JP)

(72) Inventors: Takahiro Nakayama, Nagoya (JP); Kazuhiro Mima, Toyota (JP); Hiroshi Bito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 315 days.

(21) Appl. No.: 16/254,782

(22) Filed: Jan. 23, 2019

(65) Prior Publication Data

US 2019/0291279 A1 Sep. 26, 2019

(30) Foreign Application Priority Data

Mar. 22, 2018 (JP) .............................. JP2018-054961

(51) Int. Cl.
*B25J 13/08* (2006.01)
*B25J 9/16* (2006.01)
(Continued)

(52) U.S. Cl.
CPC ........... *B25J 13/088* (2013.01); *B25J 9/1628* (2013.01); *G01C 1/00* (2013.01); *G01C 21/12* (2013.01); *G01C 25/00* (2013.01)

(58) Field of Classification Search
CPC combination set(s) only.
See application file for complete search history.

(56) References Cited

U.S. PATENT DOCUMENTS 9,170,105 B1* 10/2015 Goodzeit ............. G01C 25/005
2007/0288124 A1* 12/2007 Nagata ................... B25J 9/1694
700/258
(Continued)

FOREIGN PATENT DOCUMENTS

JP           3795498 B2    7/2006
JP        2007-064854 A    3/2007
(Continued)

OTHER PUBLICATIONS

K. Okada, Tri-Axial Piezoelectric Accelerometer, Jun. 25, 1995, The 8th International Conference on Solid-State Sensors and Actuators, and Eurosensors IX, Stockholm, Sweden, pp. 566-569 (Year: 1995).*

*Primary Examiner* — Jeff A Burke
*Assistant Examiner* — Zachary Joseph Wallace
(74) *Attorney, Agent, or Firm* — Oliff PLC

(57) ABSTRACT

A posture angle calculation apparatus 170 includes an acquisition unit 171 configured to acquire an output of an acceleration sensor 151 installed to output acceleration of a moving apparatus that moves along a moving surface in a vertical axis direction with respect to the moving surface and to acquire an output of a gyro sensor 152 installed to output an angular velocity about the vertical axis. The posture angle calculation apparatus 170 further includes a calculation unit 172 configured to assume, when the acceleration is larger than reference acceleration Rg, and the angular velocity is smaller than a preset reference angular velocity Rw, the angular velocity $\omega_z$ is zero and calculate a posture angle of the moving apparatus about the vertical axis. The posture angle calculation apparatus 170 further includes an output unit 173 configured to output data of the calculated posture angle.

8 Claims, 3 Drawing Sheets

(51) Int. Cl.
*G01C 25/00* (2006.01)
*G01C 1/00* (2006.01)
*G01C 21/12* (2006.01)

(56) References Cited

U.S. PATENT DOCUMENTS

| | | | |
|---|---|---|---|
| 2009/0171585 A1* | 7/2009 | Hoshizaki | G01C 21/16 |
| | | | 701/480 |
| 2009/0254276 A1 | 10/2009 | Faulkner et al. | |
| 2010/0138180 A1* | 6/2010 | Sugihara | B25J 9/163 |
| | | | 702/94 |
| 2010/0219011 A1* | 9/2010 | Shimoyama | B62D 37/04 |
| | | | 180/218 |
| 2016/0327396 A1 | 11/2016 | Hallberg | |
| 2018/0164102 A1* | 6/2018 | Morales | G01C 19/5776 |
| 2019/0132515 A1* | 5/2019 | Haneda | H04N 5/23258 |

FOREIGN PATENT DOCUMENTS

| | | |
|---|---|---|
| JP | 2013-095306 A | 5/2013 |
| WO | 2004/046651 A1 | 6/2004 |

\* cited by examiner

POSTURE ANGLE CALCULATION APPARATUS, MOVING APPARATUS, POSTURE ANGLE CALCULATION METHOD, AND PROGRAM

CROSS REFERENCE TO RELATED APPLICATIONS

This application is based upon and claims the benefit of priority from Japanese patent application No. 2018-054961, filed on Mar. 22, 2018, the disclosure of which is incorporated herein in its entirety by reference.

BACKGROUND

The present disclosure relates to a posture angle calculation apparatus, a moving apparatus, a posture angle calculation method, and a program.

As a method of detecting a posture angle of a moving apparatus, a method of calculating a posture angle by integrating angular velocities detected by a gyro sensor, and a method of geometrically obtaining the posture angle from acceleration detected by a plurality of acceleration sensors are known. Further, a technique for improving the accuracy of detecting the posture angle has been proposed.

A posture angle detection apparatus includes a gyro sensor for detecting a rotation angular velocity of a measurement target part and an acceleration sensor for detecting acceleration at the measurement target part in two orthogonal directions. Further, the posture angle detection apparatus includes calculation means for calculating a posture angle of the measurement target part based on detected values from the gyro sensor and the acceleration sensor. The calculation means includes an angular velocity processing unit for obtaining a rotation angle of a target direction in a high frequency component equal to or higher than a predetermined frequency from the detected value of the gyro sensor and an acceleration processing unit for obtaining a rotation angle of the target direction in a low frequency component lower than the predetermined frequency from the detected value of the acceleration sensor. The calculation means includes a posture angle determination unit for obtaining the posture angle by adding each of the rotation angles obtained by the angular velocity processing unit and the acceleration processing unit (e.g., Japanese Unexamined Patent Application Publication No. 2007-064854).

SUMMARY

However, even when the technique described in Japanese Unexamined Patent Application Publication No. 2007-064854 is used, there may be an error in detection of an angular velocity by a gyro sensor due to a change in a bias output included in the gyro sensor and a change in a temperature. On the other hand, for example, when a filtering process that assumes the detected angular velocity is zero is performed in order to prevent an error occurring in detection of an angular velocity, sensitivity of the posture angle detection apparatus decreases, which may make it difficult to detect a posture angle of a moving apparatus in some cases.

The present disclosure has been made to solve such a problem. An object of the present disclosure is to provide a posture angle calculation apparatus and the like that calculate a posture angle while reducing detection errors from data of an acceleration sensor and a gyro sensor.

A posture angle calculation apparatus according to the present disclosure includes an acquisition unit configured to acquire an output of an acceleration sensor installed to output acceleration of a moving apparatus that moves along a moving surface in a vertical axis direction with respect to the moving surface and to acquire an output of a gyro sensor installed to output an angular velocity about the vertical axis. The posture angle calculation apparatus further includes a calculation unit configured to assume, when the acceleration is larger than reference acceleration, and the angular velocity is smaller than a preset reference angular velocity, the angular velocity is zero and calculate a posture angle of the moving apparatus about the vertical axis. The posture angle calculation apparatus further includes an output unit configured to output data of the calculated posture angle.

With such a configuration, when a posture of the moving robot is relatively stable, the posture angle calculation apparatus adjusts a value of the angular velocity, whereas when the posture of the moving apparatus is not relatively stable, the posture angle calculation apparatus does not execute the processing for adjusting the value of the angular velocity.

A posture angle calculation method according to the present disclosure includes acquiring an output of an acceleration sensor installed to output acceleration of a moving apparatus that moves along a moving surface in a vertical axis direction with respect to the moving surface and to acquire an output of a gyro sensor installed to output an angular velocity about the vertical axis. The posture angle calculation method further includes assuming, when the acceleration is larger than reference acceleration, and the angular velocity is smaller than a preset reference angular velocity, the angular velocity is zero and calculate a posture angle of the moving apparatus about the vertical axis. The posture angle calculation method further includes outputting data of the calculated posture angle.

With such a configuration, in the posture angle calculation method, when the posture of the moving robot is relatively stable, a value of the angular velocity is adjusted, whereas when a posture of the moving apparatus is not relatively stable, the processing for adjusting the value of the angular velocity is not executed.

A program for causing a computer to execute the following method. The method includes acquiring an output of an acceleration sensor installed to output acceleration of a moving apparatus that moves along a moving surface in a vertical axis direction with respect to the moving surface and to acquire an output of a gyro sensor installed to output an angular velocity about the vertical axis. The method further includes assuming, when the acceleration is larger than reference acceleration, and the angular velocity is smaller than a preset reference angular velocity, the angular velocity is zero and calculate a posture angle of the moving apparatus about the vertical axis. The method further includes outputting data of the calculated posture angle.

With such a configuration, in the posture angle calculation method, when the posture of the moving robot is relatively stable, a value of the angular velocity is adjusted, whereas when a posture of the moving apparatus is not relatively stable, the processing for adjusting the value of the angular velocity is not executed.

According to the present disclosure, it is possible to provide a posture angle calculation apparatus and the like that calculate a posture angle while reducing detection errors from data of an acceleration sensor and a gyro sensor.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
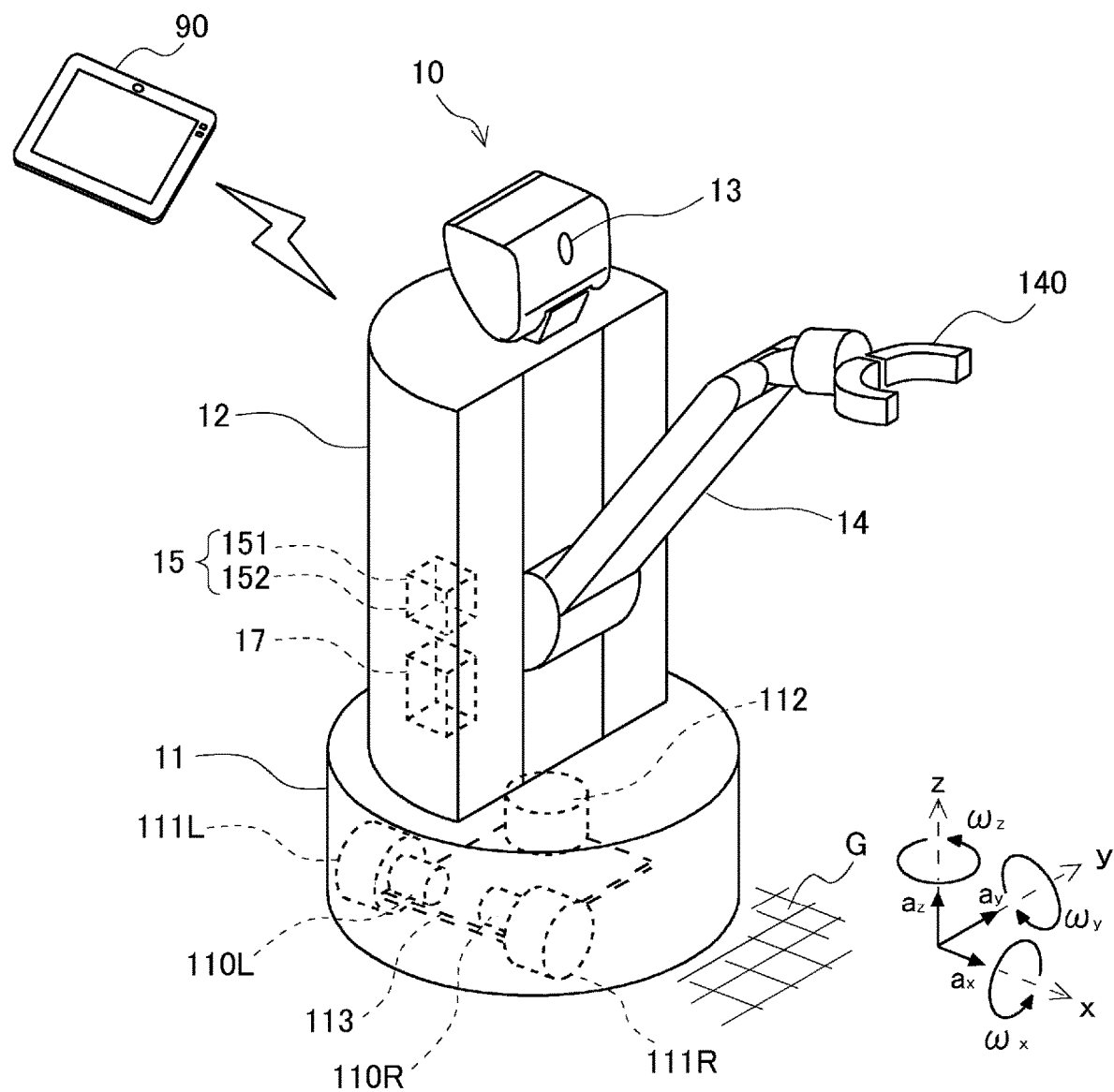
FIG. 1 is a configuration diagram showing a schematic configuration of a moving system according to an embodiment.

For the clarification of the description, the following description and the drawings may be omitted or simplified as appropriate. Further, each element shown in the drawings as functional blocks that perform various processing can be formed of a CPU (Central Processing Unit), a memory, and other circuits in hardware and may be implemented by programs loaded into the memory in software. Those skilled in the art will therefore understand that these functional blocks may be implemented in various ways by only hardware, only software, or the combination thereof without any limitation. Therefore, a component illustrated as a circuit in the following descriptions can be achieved by either hardware or software or both of them, and a component shown as a circuit for achieving a certain function could be indicated as a part of software for achieving a function similar to the function. For example, a component described as a control circuit could be described as a control unit. Throughout the drawings, the same components are denoted by the same reference signs and overlapping descriptions will be omitted as appropriate.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

EMBODIMENT

Hereinafter, a posture angle calculation apparatus and the like according to an embodiment of the present disclosure will be described with reference to the drawings. In FIG. 1, a right-handed orthogonal coordinate system is given. In FIG. 1, an x-axis and a y-axis are parallel to a floor surface G. A z-axis is perpendicular to the floor surface G.

FIG. 1 is a configuration diagram showing a schematic configuration of a moving system including a posture angle calculation apparatus according to an embodiment. The moving system 1 shown in FIG. 1 includes a moving robot 10 of an autonomously moving type. The moving robot 10 includes various sensors and controls a driving unit according to outputs of the sensors. The moving robot 10 includes a posture angle calculation apparatus for calculating a posture angle. The posture angle calculation apparatus has a function of reducing errors of the sensor. The moving system 1 mainly includes a moving robot 10 and an operation apparatus 90.

The operation apparatus 90 has a function for operating the moving robot 10. The operation apparatus 90 is, for example, a tablet terminal, a smartphone, and a personal computer. The operation apparatus 90 is communicably connected to the moving robot 10, and receives various information from the moving robot 10. The operation apparatus 90 further includes, for example, a display unit for notifying a user of a state of the moving robot 10, an input unit for the user to instruct the moving robot 10 to operate, and a communication control unit for transmitting and receiving information to and from the moving robot 10.

The moving robot 10 is communicably connected to the operation apparatus 90, and moves along the floor surface G in response to an instruction from the operation apparatus 90. The moving robot 10 mainly includes a carriage 11 and a main body 12. A lower surface of the carriage 11 is in contact with the floor surface G, and an upper surface thereof supports the main body 12. The main body 12 mainly includes an image sensor 13, a robot arm 14, a motion sensor 15, and a robot control apparatus 17.

The carriage 11 is an omniorientation carriage having a function of moving on the floor surface G and a function of turning the main body 12 supported by the carriage 11. The omniorientation carriage may be referred to as an omnidirectional carriage, an omniorientation moving carriage, or an omnidirectional moving carriage. The carriage 11 includes a wheel driving unit 110L, a wheel driving unit 110R, a wheel 111L, a wheel 111R, a turn driving unit 112, and a frame 113 as main components.

Each of the wheel driving unit 110L and the wheel driving unit 110R is an actuator for driving the wheel 111L and the wheel 111R that are brought into contact with the floor surface G, respectively. The wheel 111L and the wheel 111R are spaced coaxially from each other and can be driven independently from each other. Thus, when the wheel 111L and the wheel 111R rotate synchronously in the same direction, the carriage 11 travels straight. When a rotation speed or a rotation direction of the wheel 111L differs from a rotation speed or a rotation direction of the wheel 111R, respectively, the carriage 11 travels while turning according to the difference or turns without moving. The wheel driving unit 110L and the wheel driving unit 110R are provided on the frame 113. The carriage 11 includes non-driven wheels (not shown). The non-driven wheels support the carriage 11 on the floor surface G and follow the wheel 111L and the wheel 111R, respectively.

The turn driving unit 112 has a function of turning the main body 12. The turn driving unit 112 is provided on the frame 113 and includes a turning axis along a z-axis direction perpendicular to the floor surface G. The turn driving unit 112 also includes an actuator for rotating the turn driving unit 112. Thus, when the turn driving unit 112 rotates, the main body 12 of the moving robot 10 changes the posture angle about the turning axis.

The image sensor 13 captures an image including the robot arm 14 of the main body part. Data of the image captured by the image sensor 13 is used to recognize objects around the moving robot 10. The data of the image captured by the image sensor 13 is used for controlling the robot arm 14.

The robot arm 14 is an articulated arm provided on the main body 12. The robot arm 14 extends from the main body 12 and includes a robot hand 140 at its distal end. Each of the robot arm 14 and the robot hand 140 includes an actuator in its joint part and can perform an operation of grasping or releasing an object according to an instruction received from the operation apparatus 90.

The motion sensor 15 has a function of detecting a change in the movement and posture of the moving robot 10. The motion sensor 15 includes an acceleration sensor 151 and a gyro sensor 152. The acceleration sensor 151 detects acceleration $a_x$ in an x-axis direction, acceleration $a_y$ in a y-axis direction, and acceleration $a_z$ in the z-axis direction, and then outputs values of the detected acceleration. The acceleration sensor 151 is, for example, an acceleration sensor of a piezoresistance type, a capacitance sensing type, or a heat sensing type.

The gyro sensor 152 detects an angular velocity $\omega_x$ about the x axis, an angular velocity $\omega_y$ about the y axis, and an angular velocity $\omega_z$ about the z axis, and then outputs values of the detected angular velocities. The gyro sensor 152 is, for example, a vibrating gyro sensor that detects an angular velocity using a Coriolis force.

The robot control apparatus 17 receives a signal from each component, processes the received signal, and sends an instruction to each component as appropriate based on a result of the processing. The robot control apparatus 17 is composed of a substrate on which a plurality of semiconductors and the like are mounted. For example, the robot control apparatus 17 receives an instruction from the operation apparatus 90 and operates each component of the moving robot 10 based on the received instruction.

Figure 2:
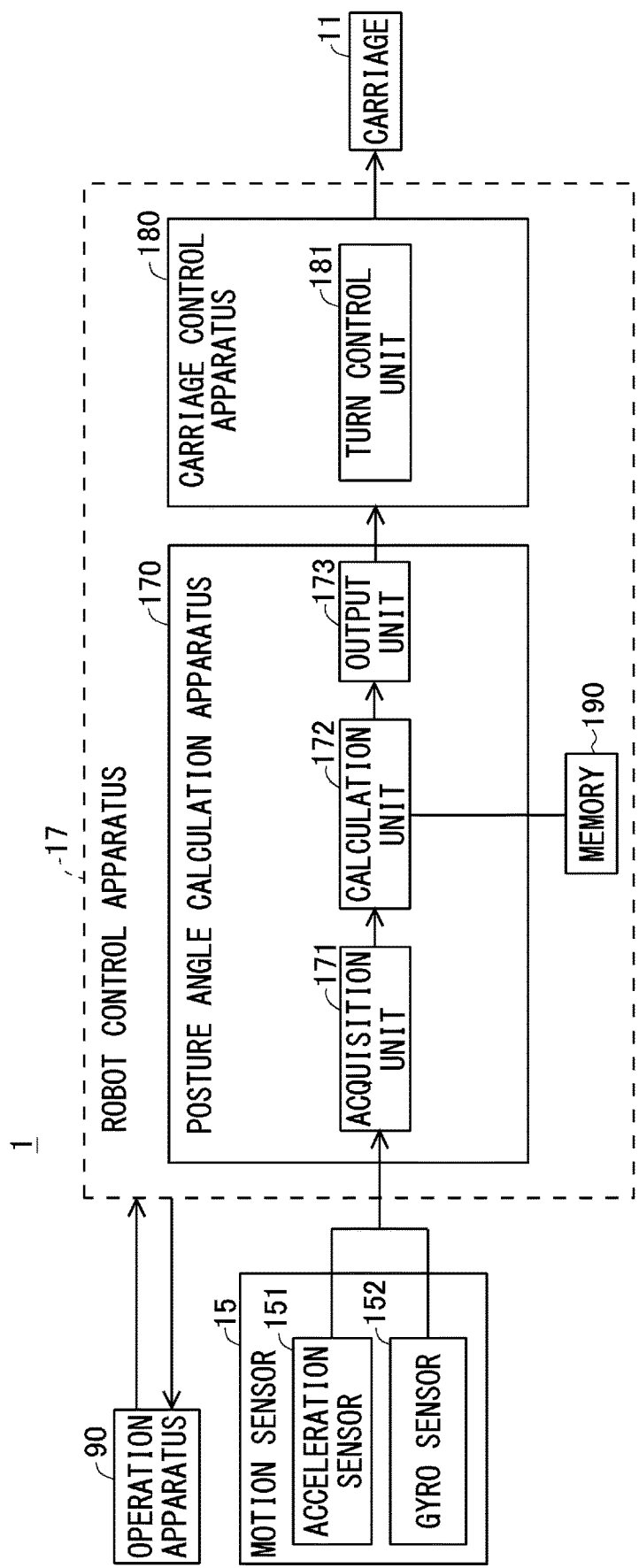
FIG. 2 is a view showing a configuration of a movement control apparatus including a posture angle calculation apparatus according to the embodiment.

The details of the robot control apparatus 17 will be described with reference to FIG. 2. FIG. 2 is a view showing a configuration of the robot control apparatus according to the embodiment. The robot control apparatus 17 mainly includes a posture angle calculation apparatus 170, a carriage control apparatus 180, and a memory 190.

The posture angle calculation apparatus 170 receives an output of the motion sensor 15, calculates the posture angle of the moving robot 10 based on the received output, and then outputs a result of the calculation to the carriage control apparatus. The posture angle calculation apparatus 170 includes an acquisition unit 171, a calculation unit 172, and an output unit 173.

The acquisition unit 171 is an interface that receives the output from the motion sensor 15. The acquisition unit 171 acquires the output of the acceleration sensor 151 and the output of the gyro sensor 152. The acquisition unit 171 supplies the acquired output of each sensor to the calculation unit 172.

The calculation unit 172 receives the outputs of the respective sensors from the acquisition unit 171 and calculates the posture angle of the moving robot 10. The calculation unit 172 is connected to the memory 190, and acquires data stored in the memory 190 as appropriate. Specifically, for example, the calculation unit 172 acquires a program stored in the memory 190, and calculates the posture angle based on the acquired program. The calculation unit 172 supplies data of the calculated posture angle to the output unit 173.

The output unit 173 is an interface that receives the data of the posture angle calculated by the calculation unit 172 and outputs it to the carriage control apparatus 180.

The carriage control apparatus 110 has a function of controlling each of the driving of the wheel driving unit 110L, the wheel driving unit 110R, and the turn driving unit 112 that are included in the carriage 11. That is, the carriage control apparatus 118 includes a turn control unit 181 for controlling the posture angle of the carriage 11. The turn control unit 181 has a function of changing the posture angle of the carriage 11 by controlling each of the wheel driving unit 110L, the wheel driving unit 110R, and the turn driving unit 112.

The memory 190 is connected to the calculation unit 172 and supplies stored data as appropriate to the calculation unit 172. The memory 190 is a storage apparatus composed of a volatile or non-volatile memory, such as a DRAM (Dynamic Random Access Memory), a flash memory, or an SSD (Solid State Drive), or a combination thereof.

Figure 3:
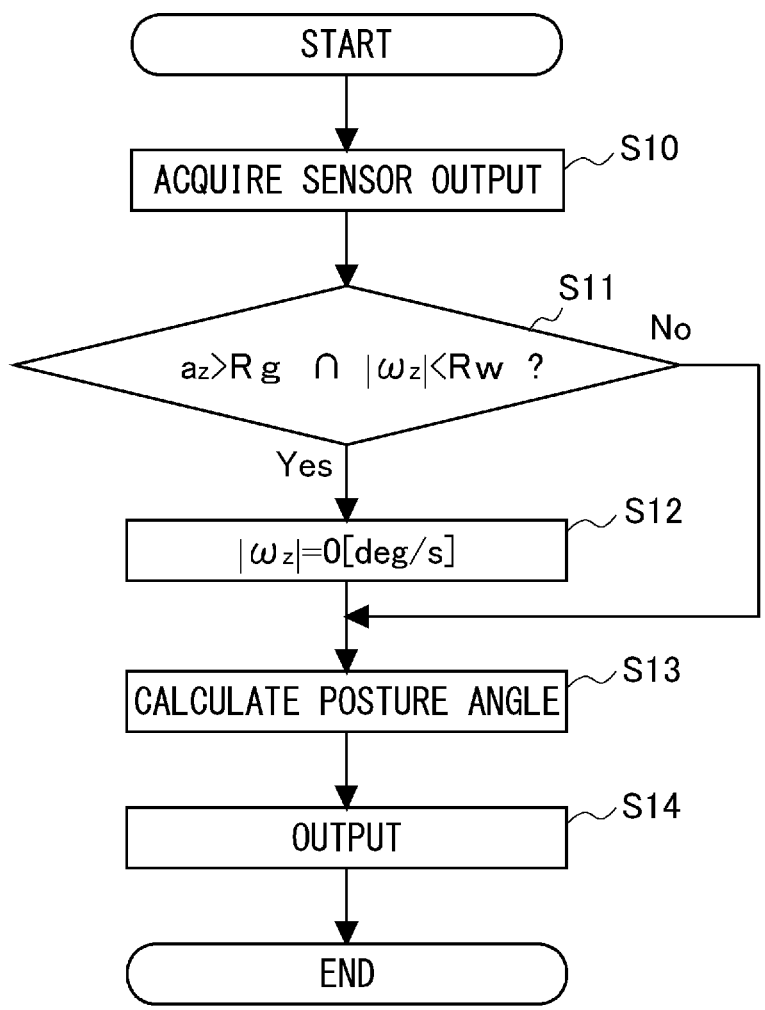
FIG. 3 is a flowchart showing processing of the posture angle calculation apparatus according to the embodiment.

Next, processing of the posture angle calculation apparatus will be described with reference to FIG. 3. The posture angle calculation apparatus 170 performs processing for reducing errors of the motion sensor 15 under a preset condition. FIG. 3 is a flowchart showing the processing of the posture angle calculation apparatus according to the embodiment.

First, the posture angle calculation apparatus 170 acquires the output of the motion sensor 15 (Step S10). As described above, the acquired output of the motion sensor 15 is supplied to the calculation unit 172.

Next, the posture angle calculation apparatus 170 determines whether the acceleration $a_z$ in the z-axis direction among the acquired outputs is larger than preset reference acceleration Rg, and whether an absolute value of the angular velocity $\omega_z$ about the z-axis is smaller than a reference angular velocity Rw (Step S11). That is, the posture angle calculation apparatus 170 determines whether the following Expressions (1) and (2) hold true.

[Expression 1]

$$a_z > Rg \tag{1}$$

[Expression 2]

$$|\omega z| < Rw \tag{2}$$

The reason why the posture angle calculation apparatus 170 calculates Expression (1) will be described here. The posture angle calculation apparatus 170 determines whether the floor surface G is inclined by calculating Expression (1). That is, when the moving robot 10 that moves along the moving surface is positioned on a horizontal plane, the z-axis direction perpendicular to the floor surface G, which is the moving surface, is aligned with the gravity direction. Thus, in this case, the acceleration $a_z$ in the z-axis direction is about 9.8 m/s². When the floor surface G on which the moving robot 10 is positioned is inclined, the z axis and the gravity direction form an angle corresponding to the inclination of the floor surface G. Thus, in this case, the acceleration $a_z$ is smaller than about 9.8 m/s². Therefore, the reference acceleration Rg can be set, for example, to 90% of gravitational acceleration in a stationary state. When the reference acceleration Rg is set to 90% of the gravitational acceleration in the stationary state, the posture angle calculation apparatus 170 determines whether the moving robot 10 is positioned on the floor surface G that is close to relatively horizontal based on the output of the acceleration in the z-axis direction acquired from the acceleration sensor 151.

Next, the reason why the posture angle calculation apparatus 170 calculates Expression (2) will be described. The posture angle calculation apparatus 170 calculates Expression (2) to determine whether the moving robot 10 is performing a turning operation. That is, when the moving robot 10 is performing the turning operation, the angular velocity $\omega_z$ about the z axis acquired from the gyro sensor 152 is output according to the turning operation. However, the output from the gyro sensor 152 may include an error. For example, a gyro sensor using vibrating MEMS (Microelectromechanical systems) technology may generate a small output in a state where no angular velocity is generated. A correct calculation cannot be performed if such an output is used as it is to calculate the posture angle. Further, the posture angle calculation apparatus 170 calculates the angle by integrating the angular velocities output from the gyro sensor 152. Therefore, when the output including the error from the gyro sensor 152 is continuously used as it is, there is a possibility that errors may be accumulated little by little. In order to reduce the above-described errors by performing processing to be described later, the posture angle calculation apparatus 170 determines whether a magnitude (an absolute value) of the output from the gyro sensor 152 is smaller than the reference angular velocity Rw. The reference angular velocity Rw is, for example, 0.6 deg/s (0.6 degrees per second).

In Step S11, when at least one of Expressions (1) and (2) does not hold true (Step S11: No), the posture angle calculation apparatus 170 performs processing for calculating the posture angle (Step S13).

On the other hand, when both Expressions (1) and (2) hold true (Step S11: Yes) in Step S11, the posture angle calculation apparatus 170 performs processing to set the angular velocity $\omega_z$ about the z axis to zero (Step S12). That is, the posture angle calculation apparatus 170 performs the processing of the following Equation (3).

[Equation 3]

$$|\omega z|=0 \quad (3)$$

Specifically, the posture angle calculation apparatus 170 performs processing for adjusting the value of the angular velocity co, i.e., assumes the angular velocity $\omega_z$ about the z axis is zero.

Next, the posture angle calculation apparatus 170 assumes the angular velocity $\omega_z$ is zero and calculates the posture angle (Step S13). Next, the posture angle calculation apparatus 170 outputs a result of the calculation (Step S14).

As described above, when the acceleration $a_z$ is larger than the preset reference acceleration Rg, and the angular velocity $\omega_z$ is smaller than the preset reference angular velocity Rw, the posture angle calculation apparatus 170 assumes the angular velocity $\omega_z$ is zero and calculates the posture angle of the moving robot 10 about the vertical axis.

When the posture angle of the moving robot 10 is changed, it is preferable that the turn control unit 181 control the turn driving unit in such a way that the moving robot 10 turns at an angular velocity not less than ten times the reference angular velocity. In other words, it is preferable that the reference angular velocity Rw be sufficiently smaller than the angular velocity at which the turn control unit 181 controls the turn driving unit. Such a setting enables the moving robot 10 to distinguish between the case when the turn control unit 181 changes the posture angle and the case when the turn control unit 181 does not change the posture angle, and only the error included in the output of the gyro sensor 152 is output, even when the moving robot 10 performs the above-described processing.

With such a configuration, when the posture of the moving robot is relatively stable, the posture angle calculation apparatus according to the embodiment adjusts the value of the angular velocity, whereas when the posture of the moving apparatus is not relatively stable, the posture angle calculation apparatus does not execute the processing for adjusting the value of the angular velocity. Therefore, according to the embodiment, it is possible to provide a posture angle calculation apparatus and the like that calculate the posture angle while reducing detection errors in the data of the acceleration sensor and the gyro sensor.

Note that the present disclosure is not limited to the above-described embodiment, and can be appropriately changed as follows without departing from the spirit of the present disclosure.

For example, although the moving robot has been described in the embodiment, this embodiment may be employed by, for example, an automobile, a bicycle, a ship, or a hovercraft as long as it is a moving apparatus that moves along the moving surface.

In addition, the three-axis acceleration sensor 151 and the triaxial gyro sensor are described in the embodiment. Alternatively, the acceleration sensor may output acceleration in the z-axis direction. Further, the gyro sensor may output an angular velocity about the z axis. In such a case, the posture angle calculation apparatus may separately acquire the acceleration in the axial direction orthogonal to the z axis and the angular velocity about the axis orthogonal to the z axis.

In the embodiment, the posture angle calculation apparatus 170 is included in the moving robot 10. Alternatively, the posture angle calculation apparatus 170 may not be included in the moving robot 10 and instead may be included in the operation apparatus 90 or the like that is communicatively connected to the moving robot 10.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A posture angle calculation apparatus comprising:
    an acquisition unit configured to acquire an output of an acceleration sensor installed to output acceleration of a moving apparatus that moves along a moving surface in a vertical axis direction with respect to the moving surface and to acquire an output of a gyro sensor installed to output an angular velocity about the vertical axis; and
    a calculation unit configured to:
        calculate a posture angle of the moving apparatus about the vertical axis based on an assumed angular velocity of zero when the acceleration is larger than a preset reference acceleration and the angular velocity is smaller than a preset reference angular velocity,
        calculate the posture angle of the moving apparatus about the vertical axis based on the angular velocity when the acceleration is equal to or smaller than the preset reference acceleration and when the angular velocity is smaller than the preset reference angular velocity, and
        calculate the posture angle of the moving apparatus about the vertical axis based on the angular velocity when the acceleration is larger than the preset reference acceleration and when the angular velocity is equal to or larger than the preset reference angular velocity; and an output unit configured to output data of the calculated posture angle in order to control a turning motion around the vertical axis and to control the posture angle of the moving apparatus.

2. The posture angle calculation apparatus according to claim 1, wherein
the acquisition unit acquires acceleration in directions of three axes including the vertical axis and two axes orthogonal to the vertical axis and an angular velocity about the three axes, and
the calculation unit calculates the posture angle about the three-axial directions of the moving apparatus based on each of the acceleration in the directions of the three axes and the angular velocity about each of the three axes.

3. The posture angle calculation apparatus according to claim 1, wherein the preset reference acceleration is 90% of gravitational acceleration in a stationary state.

4. The posture angle calculation apparatus according to claim 1, wherein the reference angular velocity is 0.6 deg/s.

5. A moving apparatus comprising:
the posture angle calculation apparatus according to claim 1;
an acceleration sensor configured to detect the acceleration and output the detected acceleration to the posture angle calculation apparatus;
a gyro sensor configured to detect the angular velocity and output the detected angular velocity to the posture angle calculation apparatus; and
a turn control unit configured to control a turn driving unit that performs the turning motion around the vertical axis and to control the posture angle by driving the turn driving unit.

6. The posture angle calculation apparatus according to claim 1, wherein:
the acceleration is larger than the preset reference acceleration when the vertical axis that is perpendicular to the moving surface upon which the moving apparatus moves is aligned with a gravity direction, and
the acceleration is equal to or smaller than the preset reference acceleration when the vertical axis that is perpendicular to the moving surface upon which the moving apparatus moves is not aligned with the gravity direction.

7. A posture angle calculation method comprising:
acquiring an output of an acceleration sensor installed to output acceleration of a moving apparatus that moves along a moving surface in a vertical axis direction with respect to the moving surface and acquiring an output of a gyro sensor installed to output an angular velocity about the vertical axis;
calculating a posture angle of the moving apparatus about the vertical axis based on an assumed angular velocity of zero when the acceleration is larger than a preset reference acceleration and the angular velocity is smaller than a preset reference angular velocity;
calculating the posture angle of the moving apparatus about the vertical axis based on the angular velocity when the acceleration is equal to or smaller than the preset reference acceleration and when the angular velocity is smaller than the preset reference angular velocity;
calculating the posture angle of the moving apparatus about the vertical axis based on the angular velocity when the acceleration is larger than the preset reference acceleration and when the angular velocity is equal to or larger than the preset reference angular velocity; and
outputting data of the calculated posture angle in order to control a turning motion around the vertical axis and to control the posture angle of the moving apparatus.

8. A non-transitory computer readable medium storing a control program for causing a computer to execute a posture angle calculation method comprising:
acquiring an output of an acceleration sensor installed to output acceleration of a moving apparatus that moves along a moving surface in a vertical axis direction with respect to the moving surface and acquiring an output of a gyro sensor installed to output an angular velocity about the vertical axis;
calculating a posture angle of the moving apparatus about the vertical axis based on an assumed angular velocity of zero when the acceleration is larger than a preset reference acceleration and the angular velocity is smaller than a preset reference angular velocity;
calculating the posture angle of the moving apparatus about the vertical axis based on the angular velocity when the acceleration is equal to or smaller than the preset reference acceleration and when the angular velocity is smaller than the preset reference angular velocity;
calculating the posture angle of the moving apparatus about the vertical axis based on the angular velocity when the acceleration is larger than the preset reference acceleration and when the angular velocity is equal to or larger than the preset reference angular velocity; and
outputting data of the calculated posture angle in order to control a turning motion around the vertical axis and to control the posture angle of the moving apparatus.

* * * * *